United States Patent [19]

Seip et al.

[11] Patent Number: 4,898,073
[45] Date of Patent: Feb. 6, 1990

[54] VACUUM BRAKE FORCE BOOSTER FOR USE WITH AUTOMOTIVE VEHICLES

[75] Inventors: Hermann Seip, Bad Vilbel; Wilfried Wagner, Huettenberg-Weidenhausen; Ralf Jakobi, Liederbach, all of Fed. Rep. of Germany

[73] Assignee: Alfred Teves GmbH, Frankfurt, Fed. Rep. of Germany

[21] Appl. No.: 277,288

[22] Filed: Nov. 29, 1988

[30] Foreign Application Priority Data

Dec. 1, 1987 [DE] Fed. Rep. of Germany ....... 3740691

[51] Int. Cl.4 .............................................. F15B 9/10
[52] U.S. Cl. .................................. 91/369.2; 92/165 R
[58] Field of Search ...................... 91/4, 369.2, 376 R; 92/165 R

[56] References Cited

U.S. PATENT DOCUMENTS 4,641,568 2/1987 Boehm et al. ...................... 91/369.2
4,671,167 6/1987 Endo et al. ......................... 91/369.2

FOREIGN PATENT DOCUMENTS 3344110 6/1985 Fed. Rep. of Germany ..... 91/369.2
2044376 10/1980 United Kingdom ............... 91/369.2

Primary Examiner—Robert E. Garrett
Assistant Examiner—Frank H. Stephan
Attorney, Agent, or Firm—Robert P. Seitter

[57] ABSTRACT

A brake booster is disclosed wherein the risk of damage to the control valve housing of the booster in the area of the support of the guiding sleeve which guides the push rod is precluded. The guiding sleeve of the booster comprises an axial extension which, while accommodating the pressure plate and the reaction disc of the booster is located, in sealing manner, in the axial bore of the control valve housing of the booster.

11 Claims, 4 Drawing Sheets

VACUUM BRAKE FORCE BOOSTER FOR USE WITH AUTOMOTIVE VEHICLES

BACKGROUND OF THE INVENTION

The present invention relates to a vacuum brake force booster for use with automotive vehicles of the type comprising a vacuum housing sealingly subdivided, through an axially movable wall, into a vacuum chamber and a working chamber. A mechanically actuable control valve is provided for connecting the working chamber to the vacuum chamber and to the atmosphere, respectively, and the axially movable control valve housing is made of a thermoplastic material accommodating, within an axial bore, a rubber-elastic reaction disc in abutment with a pressure plate of a pushrod for transmitting the brake force to an actuating piston of a master cylinder which is located on the vacuum side at the vacuum housing. The movable wall is in communication with the control valve housing and a guiding sleeve is provided to axially guide the pushrod. The guiding sleeve is provided with a radial flange.

A vacuum brake force booster of this type is taught by Applicant's prior application P 37 09 172. That brake force booster provides for the radial flange of the guiding sleeve to be axially supported within the bore of the control valve housing and is straddled, in axially formlocking manner, by a holding member in communication with the control valve housing.

One disadvantage of this brake force booster is the heavy load on the control valve housing in the area of the support of the radial flange of the guide sleeve upon occurrence of lateral forces acting upon the pushrod increasing the risk of damage to the control valve housing which is a thin wall in that area.

SUMMARY OF THE INENTION

It is, therefore, the object of the present invention to provide a brake force booster of the afore-described type in which the afore-mentioned risk of damage is substantially avoided.

This object, in the practice of the invention, is achieved in that the guide sleeve comprises an axial extension which, in accommodating the pressure plate and the reaction disc, is sealingly located in the axial bore of the control valve housing.

Accordingly, a vacuum brake force booster for use with automotive vehicles is provided which substantially increases the operating safety while using low-cost individual components. At the same time, the configuration of the brake force booster according to the invention assures excellent guidance of the pushrod. Also, there is effective protection to the plastic control valve housing against the high pressures in the reaction disc.

According to an advantageous embodiment of the invention, the guiding sleeve in the axial bore is held by means of a retaining ring provided in a radial recess formed on the pushrod-side end of the bore, with the basic material of the retaining ring corresponding to that of the control valve housing and the attachments thereof with the control valve housing being effected by ultrasonic welding, thereby insuring increased strength in the connection of the pushrod to the control valve housing which is especially important in brake force boosters of larger diameters.

According to an important feature of the invention, the axial extension of the guiding sleeve is press fitted in the axial bore and the wall of the axial bore is provided with axial ribs to better accommodate the elastic deformation of the press fit.

According to another feature of the invention the axial extension of the guiding sleeve partly straddles a metallic transmission ring guiding a transmission disc located between the control valve piston and the reaction disc, with the transmission ring, on the one hand, supporting on the reaction disc and, on the other hand, supporting on the bottom of the axial bore, with the sealing of the axial extension against the control valve housing being effected by means of a gasket located between the wall of the axial bore and the radially outwardly disposed surface of the transmission ring. This feature enables the radial play between the transmission disc and the transmission ring to be kept substantially low to thereby preclude risk of damage to the reaction disc which, in that area, is under a high pressure.

Another advantageous feature of the brake force booster according to the invention provides for the axial extension to engage an axial recess confining a radial annular face in the control valve housing, the size of which determines the brake force booster, with the sealing of the axial extension against the control valve housing being effected by means of the reaction disc.

BRIEF DESCRIPTION OF THE DRAWING

Further details and advantages of the vacuum brake force booster of the invention will become evident from the following Detailed Description of a Preferred Embodiment with reference to the drawing, wherein corresponding parts are provided with like reference characters.

In the drawings.

DETAILED DESCRIPTION OF A PREFERRED EMBODIMENT

Figure 1:
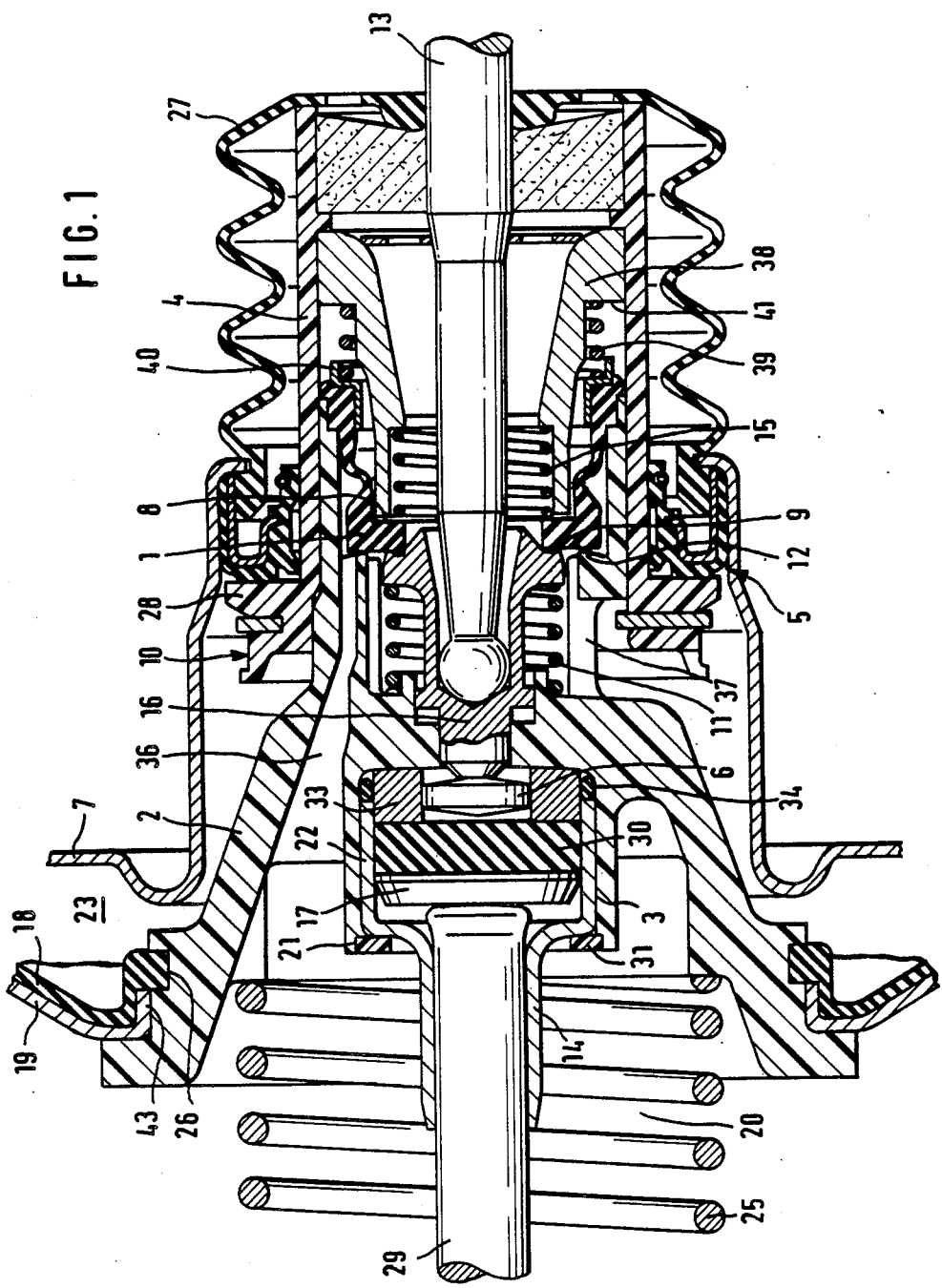
FIG. 1 is a partial longitudinal section through a first embodiment of the vacuum brake force booster according to the invention.

The vacuum housing of the brake force booster comprises two housing portions interconnected at a joint, of which housing portions, for the sake of clarity, only the brake pedal-side housing half 7 is shown in part. The interior of the vacuum pressure housing, through a booster piston 19, is subdivided into a vacuum compartment 20 which, through a vacuum connection, is in communication with a vacuum source (not shown in any detail), and a working chamber 23. The booster piston 19 comprises a rolling diaphragm 18 in abutment therewith in the working chamber 23 and a control valve housing of two-piece configuration in communication with the booster piston 19 and the rolling diaphragm 18. The rolling diaphragm 18, at the joint 26, is loaded in pressure-tight manner, straddling with the inner section thereof the internal rim 43 of the booster piston 19 and sealing it against the front portion of the control valve housing. The control valve housing 10 with its cylindrical guide member 4 protrudes from the booster housing and, by means of a bellows 27, is protected against contamination of the surface thereof. The control valve housing 10, with a sliding guide ring 5, externally seals the working chamber 23.

Disposed in axially displaceable manner in the interior of the control valve housing 10 is a control rod including a piston rod 13 and a valve piston 16, which control rod, through a clevis, not shown in any detail, is capable of being connected to a brake pedal of an automotive vehicle. The control valve housing 10 also comprises a valve arrangement 1, 9, 12 actuated by the valve piston 16 and, through channels 36, 37, controls the pressure difference between the vacuum chamber 20 and the working chamber 23. The front part 2 of the control valve housing 10 is disposed in the vacuum chamber 20, and includes an axial bore 3 in the function of which will be described hereinafter. A pushrod 29 actuates a master brake cylinder (not shown in any detail) secured to the front side of the bottom of the booster housing.

To attain a precise guidance of the pushrod 29, a guiding sleeve 14 is provided, the axial extension 22 of which is introduced into the axial bore 3 of the front portion 2 to guide a reaction disc 30 located therein and of a pressure plate 17 provided between the reaction disc 30 and the control housing-sided end of the pushrod 29. The axial extension 22 of the guiding sleeve 14 partly encloses a metallic transmission ring 33 in the bore of which is located a transmission disc 6 that cooperates with the control valve piston 16. The face of the disc 6 contacts the reaction disc 30, as does the annular front face of the transmission ring 33 and determines the transmission of the vacuum brake force booster of the invention. The guiding sleeve 14 is locked by a retaining ring 31 and is sealed against the front portion 2 of the control valve housing 10 and the axial bore 3 thereof, respectively, by means of a gasket 34 located in the radial gap between the surface of the transmission ring 33 and the wall of the axial bore 3. The retaining ring 31, the basic material of which, preferably, is identical with that of the front portion 2 of the control valve housing 10, is located in the radial recess 21 thereof and is welded in place ultrasonically.

For restoring the booster piston 19, a restoring spring 25 is provided which is located between the front portion 2 of the control valve housing 10 and the bottom of the booster housing.

The control unit of the vacuum brake force booster is shown in the released position, that is, in a position in which the two compartments 20, 23 are separated from one another. For, in that position, the two sealing seats 9, 12 are in abutment with the sealing face of a poppet valve 1 which, on the side facing away from the sealing face, is provided with a stop 8 which, through a sleeve 38, will sweep the guiding member 4. The guiding portion 4, in the released position, with the collar 28, is in abutment with the sliding guide ring 5, and the sealing seat 9 on the control valve piston 16 is forced by a piston rod return spring 11 against the sealing face of the poppet valve 1. The poppet valve 1, at the same time, is preloaded toward the two sealing seats 9, 12 by means of a compression spring 15 which, with the other end thereof, is supported on the sleeve 38. Also, a second compression spring 39 is provided which, on the one hand, is supported on a guide 40 of the poppet valve 1 and, on the other hand, is supported on an annular face 41 of the sleeve 38 to keep the two control valve housing portions 2, 4 apart.

Figure 2:
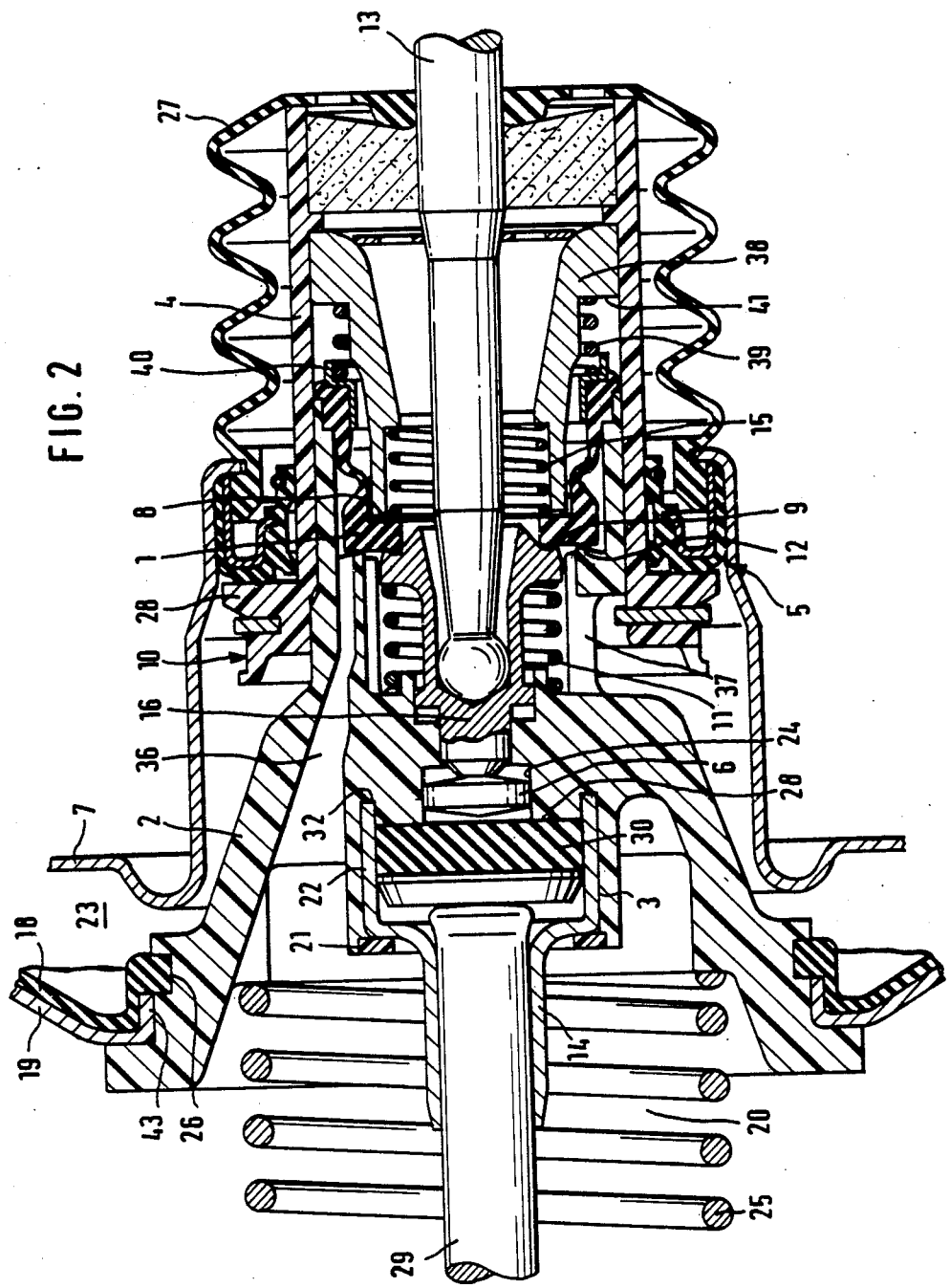
FIG. 2 is a partial longitudinal section through a second embodiment of the vacuum brake force booster according to the invention.

In the embodiment shown in FIG. 2, the transmission ring 33 (FIG. 1) is replaced by a radial annular face 28 formed on the front portion 2 of the control valve housing 10, which annular face 28, on the one hand, is confined by a bore 24 accommodating the transmission disc 6 and, on the other hand, is confined by an axial recess 32. The recess 32 is engaged by the end of the axial extension 22, with sealing thereof against the axial bore 3 being effected by the reaction disc 30.

Figure 3:
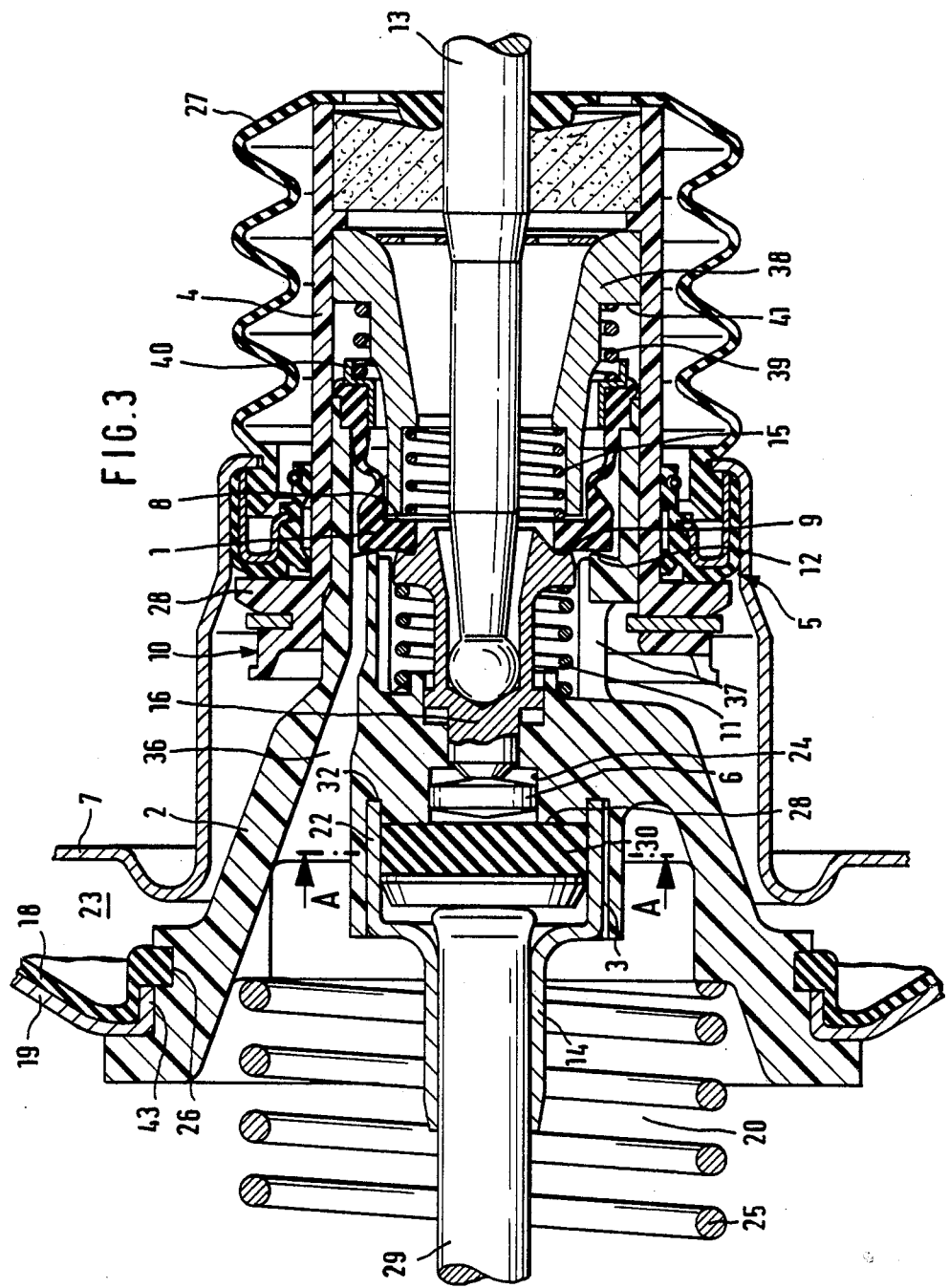
FIG. 3 is a partial longitudinal section through a third embodiment of the vacuum brake force booster according to the invetion.
Figure 4:
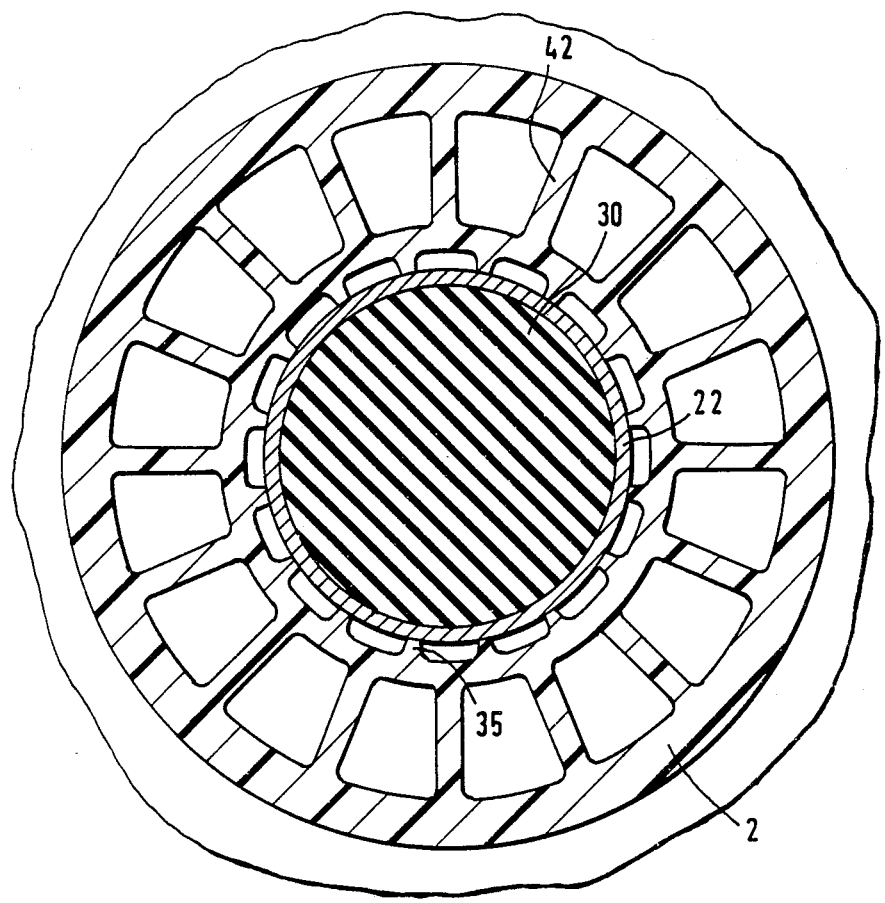
FIG. 4 is a cross sectional view taken along the line A—A in FIG. 3.

A similar arrangement is shown in FIGS. 3 and 4. In that embodiment, the axial extension 22 of the guiding sleeve 14 is configured to be a larger diameter than the axial bore 3 of the front portion 2 so that the axial extension 22 when mounting the guiding sleeve 14 into the axial bore 3, is pressed thereinto in force-locking manner. The wall of the axial bore, preferably, is provided with axial ribs 35 permitting an increased elastic stretching during assembly. The axial ribs 35 preferably should be disposed between the outer reinforcing ribs 42 of the front portion 2 of the control valve housing 10.

What is claimed is:

1. A vacuum brake force booster for use with automotive vehicles, comprising a vacuum housing sealingly subdivided by an axially movable wall into a vacuum chamber and a working chamber, a mechanically actuable control valve for connecting the working chamber to the vacuum chamber and to the atmosphere, respectively, with the axially movable control valve housing thereof being formed of thermoplastic material and accommodating, within an axial bore, a rubber-elastic reaction disc in abutment with a pressure plate of a pushrod connected to an actuating piston of a master cylinder provided on a vacuum-side of the vacuum housing, the movable wall being in communication with the control valve housing and with a guiding sleeve adapted to axially guide the pushrods said guiding sleeve including a radial flange and an axial extension which, while accommodating the pressure plate and the reaction disc, is sealingly disposed in the axial bore of the control valve housing.

2. The vacuum brake force booster according to claim 1, wherein the guiding sleeve, by means of a retaining ring, is held in the axial bore, with said retaining ring being located within a radial recess formed on a pushrod-side of the bore.

3. The vacuum brake force booster according to claim 2, wherein the retaining ring is of a claw ring-type configuration.

4. The vacuum brake force booster according to claim 2, wherein the material of the retaining ring corresponds to that of the control valve housing and the connection thereof to the control valve housing is effected by ultrasonic welding.

5. The vacuum brake force booster according to claim 2, wherein the connection of the retaining ring of the control valve housing is by an adhesive.

6. The vacuum brake force booster according to claim 1, wherein the axial extension of the guiding sleeve is press fitted into the axial bore.

7. The vacuum brake force booster according to claim 6, wherein the wall of the axial bore is provided with a plurality of axial ribs.

8. The vacuum brake force booster according to claim 1, wherein the axial extension of the guiding sleeve partly straddles a transmission ring guiding a transmission disc located between the control valve piston and the reaction disc, the transmission ring, on the one hand, being supported on the reaction disc and, on the other hand, being supported on the bottom of the axial bore.

9. The vacuum brake force booster according to claim 1, wherein the axial extension engages an axial recess confining, within the control valve housing, a radial annular face the size of which determines the transmission ratio of the brake force booster.

10. The vacuum brake force booster according to claim 8, wherein the axial extension is sealed against the control valve housing by a gasket located between the wall of the axial bore and a radially outwardly disposed surface of the transmission ring.

11. The vacuum brake force booster according to claim 9, wherein the axial extension is sealed against the control valve housing by the reaction disc.

* * * * *